(12) United States Patent
Lamon et al.

(10) Patent No.: US 11,191,412 B2
(45) Date of Patent: Dec. 7, 2021

(54) FLOOR TREATMENT MACHINE AND METHOD FOR TREATING FLOOR SURFACES

(71) Applicant: CLEANFIX REINIGUNGSSYSTEME AG, Henau (CH)

(72) Inventors: Pierre Lamon, Epalinges (CH); Roland Flück, Oberwangen (CH)

(73) Assignee: Cleanfix Reinigungssysteme AG, Henau (CH)

( * ) Notice: Subject to any disclaimer, the term of this patent is extended or adjusted under 35 U.S.C. 154(b) by 152 days.

(21) Appl. No.: 16/462,902

(22) PCT Filed: Sep. 14, 2017

(86) PCT No.: PCT/EP2017/073097
§ 371 (c)(1),
(2) Date: May 21, 2019

(87) PCT Pub. No.: WO2018/095605
PCT Pub. Date: May 31, 2018

(65) Prior Publication Data
US 2020/0077860 A1 Mar. 12, 2020

(30) Foreign Application Priority Data
Nov. 23, 2016 (CH) .................................... 01548/16

(51) Int. Cl.
*A47L 11/40* (2006.01)
*G05D 1/02* (2020.01)

(52) U.S. Cl.
CPC ........ *A47L 11/4011* (2013.01); *G05D 1/0219* (2013.01); *G05D 1/0274* (2013.01); *A47L 2201/04* (2013.01); *G05D 2201/0203* (2013.01)

(58) Field of Classification Search
CPC combination set(s) only.
See application file for complete search history.

(56) References Cited

U.S. PATENT DOCUMENTS 5,279,672 A 1/1994 Betker et al.
5,696,675 A 12/1997 Nakamura et al.
(Continued)

FOREIGN PATENT DOCUMENTS

DE 102011003064 A1 7/2012
EP 1557730 A1 7/2005
(Continued)

OTHER PUBLICATIONS

International Search Report and Written Opinion dated Oct. 26, 2017 in International Application No. PCT/EP2017/073097.

*Primary Examiner* — Erin F Bergner
(74) *Attorney, Agent, or Firm* — Muncy, Geissler, Olds & Lowe, P.C.

(57) ABSTRACT

Disclosed is control of a floor treatment machine and treating floor surfaces, including a planning mode, allowing at least two zones to be defined on a floor surface to be treated, a first node to be defined in each zone and a connection path from at least one zone to a first node of another zone to be defined. At least one region of the zone edge can be input as a virtual obstacle, a direct connection between the first node of the defined zone and the first node of another zone being interrupted by the input region on the basis of real and virtual obstacles. After the complete treatment of a zone, the virtual obstacle on the zone edge is canceled and a switch to another zone is performed. Thus, zones distributed in any way can be treated in succession without the intervention of an operating person.

14 Claims, 9 Drawing Sheets

(56) References Cited

U.S. PATENT DOCUMENTS

| | | | |
|---|---|---|---|
| 8,060,254 B2 | 11/2011 | Myeong et al. | |
| 2012/0106829 A1* | 5/2012 | Lee | G05D 1/0274 |
| | | | 382/153 |
| 2013/0041526 A1* | 2/2013 | Ouyang | A01D 34/008 |
| | | | 701/2 |
| 2018/0267552 A1* | 9/2018 | Artes | A47L 9/2805 |

FOREIGN PATENT DOCUMENTS

| | | |
|---|---|---|
| EP | 1903413 A2 | 3/2008 |
| EP | 2450762 A2 | 5/2012 |
| EP | 2752726 A1 | 7/2014 |
| EP | 2752726 B1 | 5/2015 |
| WO | 2016091312 A1 | 6/2016 |

\* cited by examiner

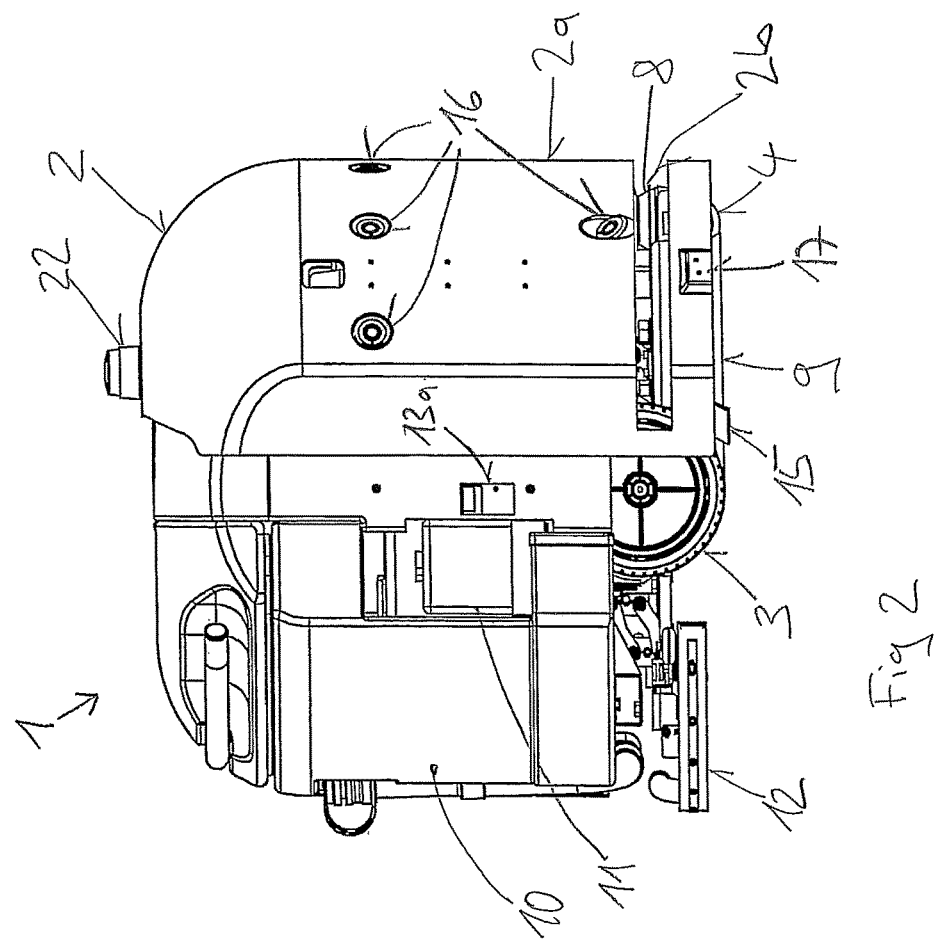
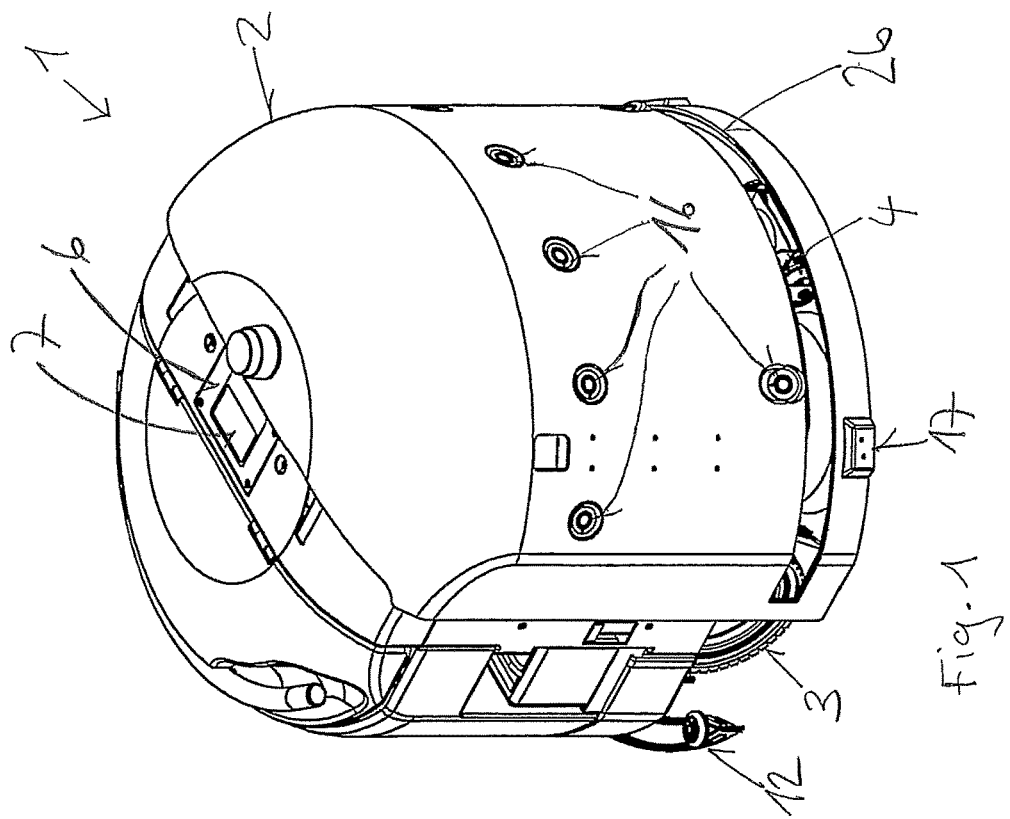

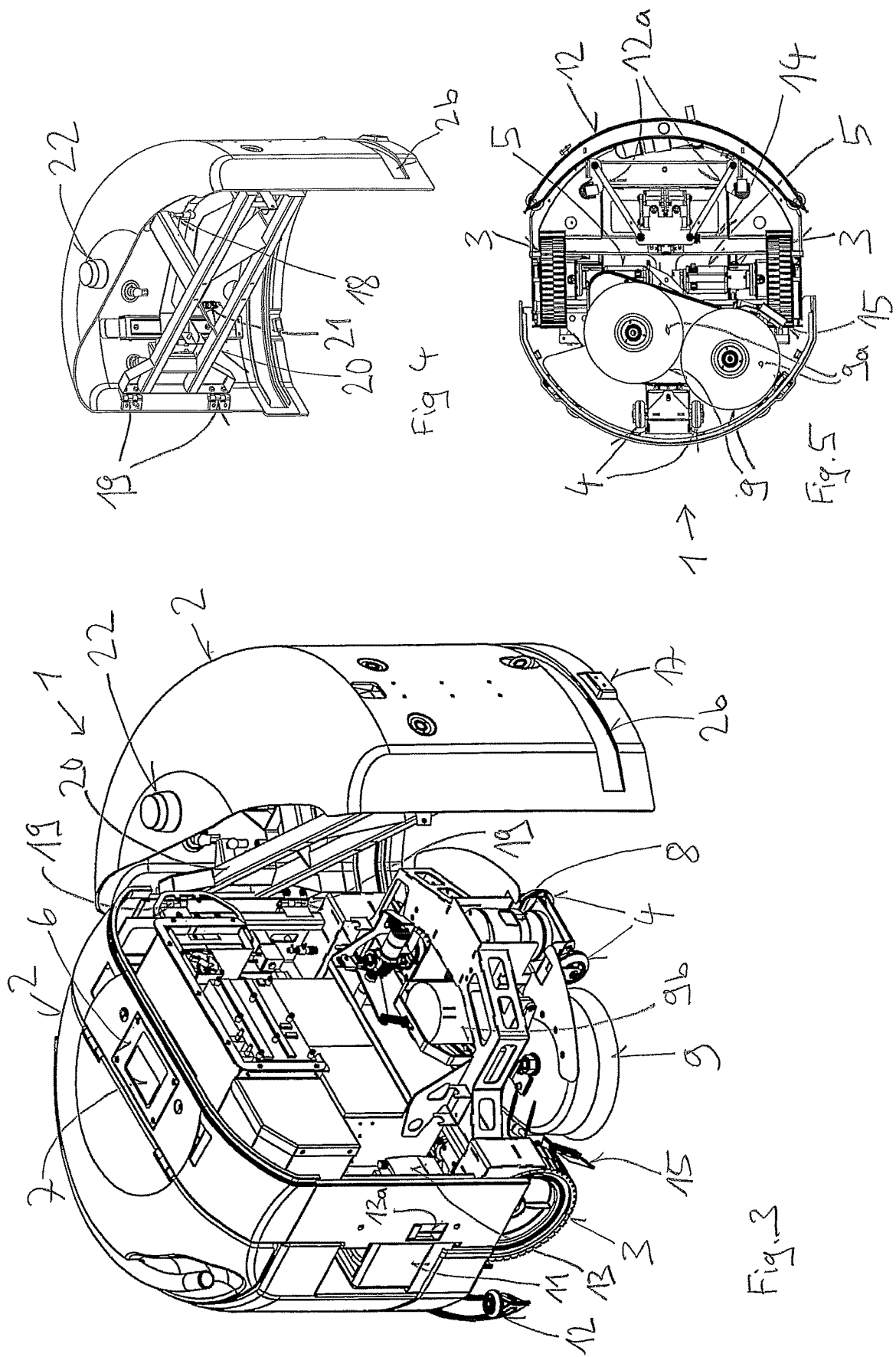

start start start start

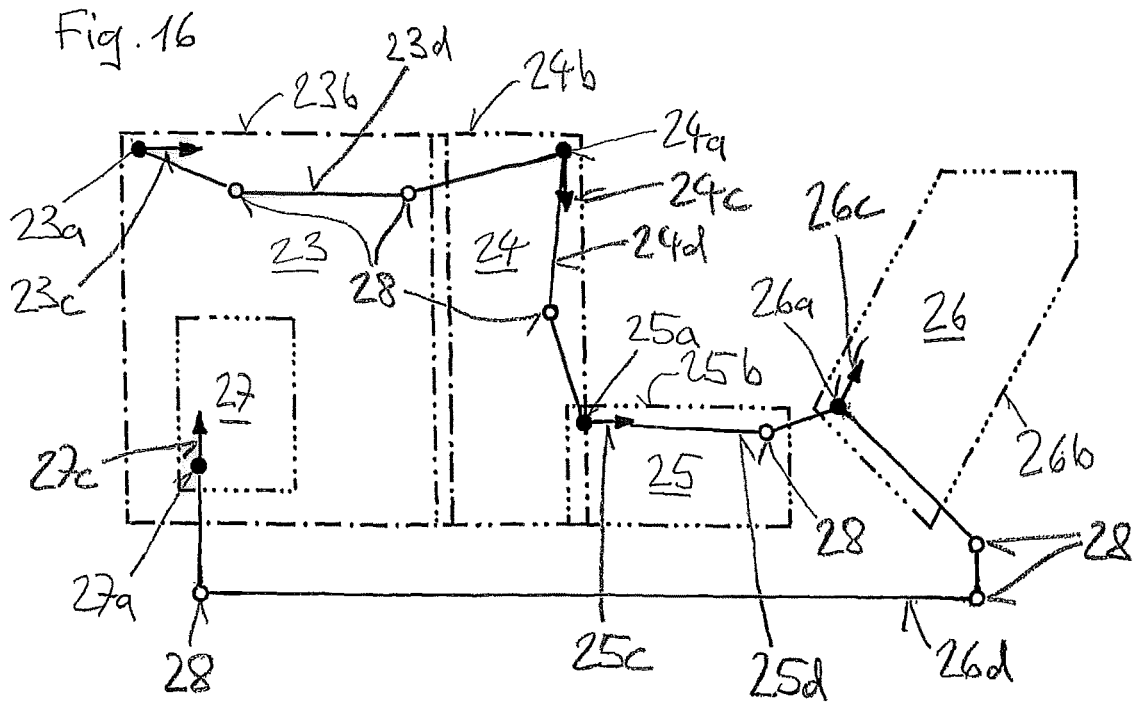

FLOOR TREATMENT MACHINE AND METHOD FOR TREATING FLOOR SURFACES

This application is a 371 National Phase of PCT Application No. PCT/EP2017/073097, filed on Sep. 14, 2017; which claims priority to Swiss Patent application 01548/16 filed Nov. 23, 2016 and each of which is herein incorporated by reference in its entirety.

The invention relates to an automatic floor treatment machine according to the preamble of claim 1 and to a method for treating floor surfaces according to the preamble of claim 10 as well as to a computer program product, which initiates the execution of a method according to the preamble of claim 14 on a program-controlled floor treatment machine.

The current invention relates in particular to machines and to methods for treating floors, the treated floor surface of which is limited by fixed elements, such as the wall sections bordering the floor surface, doors, passageways, or elements, such as columns, inner wall sections or fixed shelves, which are arranged on the floor surface, and, if applicable, by replaceable elements.

Many solutions are known from the prior art, in the case of which automatic floor cleaning machines carry out cleaning processes on floors of buildings independently. There are two approaches, which have their own individual character. In the case of the first approach, the floor surface is passed over at random, for example in that a random change of direction is chosen when striking an obstacle. Due to the fact that a map of the room, which is to be cleaned, and a plan for an advantageous cleaning route is not created, the required storage capacity is small, but the effort for the processing movement is very high. Many areas are passed over several times and a long cleaning time must be provided for cleaning as completely as possible. This method is not suitable for professional cleaning.

In the case of the second approach, the floor surface is mapped as accurately as possible and an advantageous route is determined. The planning of the route is linked to a large amount of computing effort and has to be established by operating personnel using a time-consuming learning procedure. It must be controlled that the planned route is followed in response to the cleaning. In addition, a solution for by-passing obstacles and the subsequent location of the planned route must be provided. These solutions use grids for storing the map of the room, for planning the cleaning route and for storing the cleaned areas. Due to the fact that the resolution of the grid must be as small as possible, correspondingly large amounts of data quantities must be stored and processed. The specifications necessary for avoiding obstacles are extensive and usually cannot satisfactorily solve all possible situations.

U.S. Pat. No. 5,279,672 describes a cleaning robot, which comprises a housing, two drive wheels, two support wheels, rotatable cleaning brushes on the front side, comprising a cleaning liquid supply, a suction device for extracting the contaminated cleaning liquid on the rear side. A control device comprising sensors is used to control the movement of the cleaning robot. An infrared laser scanner, which reads barcode information from the reflecting targets, which are arranged on the room boundaries, is arranged on the upper side of the cleaning robot. The reflecting targets make it possible for the cleaning robot to determine its position and the current cleaning area by means of a triangulation. For accurately detecting the position, the laser scanner must detect the angular position of at least 3 different targets simultaneously. Without recognizing three targets, the robot continues to drive for a predefined distance and if it has then still not detected three targets simultaneously, it discontinues the cleaning operation and transmits an alarm signal. When the robot can detect its position and the cleaning area, it must follow a previously programmed cleaning plan, wherein, when approaching an adjustable obstacle or element, respectively, the robot attempts to bypass said obstacle. This solution has the disadvantage that the targets with their barcodes must first be mounted and that a cleaning plan must additionally be programmed for each room. In the event that mobile elements are placed in front of targets, the cleaning robot can no longer clean automatically.

EP 1 903 413 A2 describes the creation of a map, wherein occupied points are entered into a grid and the thickness of the obstacles and of the wall are increased in accordance with the expansion of the robot, so that the robot can be moved on the map as a point without an expansion. A map, on which the room boundaries are entered as occupied grid points, always has an inaccuracy in accordance with the cell size of the grid and leads to large data quantities, because the grid must be sufficiently fine, so that the boundary can be entered to a sufficiently accurate extent. A further disadvantage of the described solution is that the controller of the robot determines a cleaning direction by way of a complex determination of the most frequent lines through the region to be treated and that a defined route must be driven in accordance with the predetermined cleaning direction. If obstacles are located in the region to be treated, it is divided into partial regions. If boundaries of the free region deviate from straight lines, many partial regions result, which have to be reduced and/or linked to other partial regions. To carry out these steps, the controller must store large data quantities and must make extensive calculations.

U.S. Pat. No. 8,060,254 B2 describes distance measurements for bordering a room to obtain grid points. Feature points are extracted from the grid points of the boundary. A position estimate and feature points are updated by means of a simultaneous localization and map building algorithm (SLAM). A sweeping direction is determined from the most frequent direction of the boundary and the grid is placed according to the sweeping direction. A map, on which the room boundaries are entered as occupied grid points, always has an inaccuracy according to the cell size of the grid and leads to data quantities, which are undesirably high. A further disadvantage of the described solution is that zones and cleaning directions have to be calculated from critical points of the map, which is linked to a high level of computing effort. After further calculations, cells possibly also have to be joined together again.

EP 1 557 730 A1 describes a solution, in the case of which the processing device creates a grid map of the room and divides the room into a plurality of partial segments by means of a drive along an outer contour of the room, which are then processed subsequently using a predetermined travel direction course, for example, in a spiral. After the processing of a partial segment, the determined position is linked to a not insignificant error. The processing device therefore firstly carries out wall tracking travel to determine its absolute position from the sequence of the direction changes and to approach a partial segment which has not yet been processed. The wall tracking travels carried out between the processing of the partial zones are linked to a large amount of effort, without the desired processing progressing at the same time.

U.S. Pat. No. 5,696,675 describes a robot control system for a robot vacuum cleaner which divides a room into regions having three different properties, namely accessible to a suction nozzle, accessible to the vacuum cleaner, and not accessible. The control system represents the three regions on a map, wherein the coordinates of the room boundary and the regions have to be input. A route function creates routes for the robot vacuum cleaner on the map. For this purpose, firstly a rectangular grid is drawn on the entire map proceeding from the input three regions by extending the boundary lines thereof. By joining together adjacent rectangles having the same property, areas arise in which routes are planned. The routes of the various areas are connected to one another via common ending or starting points. The steps for the automatic allocation into areas and the establishment of routes connected to one another are very complex. If conditions change in the room, these complex automatic steps have to be carried out again and again.

DE 10 2011 003 064 A1 describes a method for processing a surface by means of a robot vehicle. In a first step, the vehicle is guided along the outline of the surface to be processed and an outline map is created at the same time. In a second step, the surface is divided by the controller into individual segments. In the division, the controller uses geometric basic shapes, wherein the number and size of the individual segments are produced via a plurality of random classifications. A large amount of processing effort results in this case and the determined classification is merely dependent on the shape of the surface to be processed and not on properties of the partial regions thereof. In a third step, the respective shape of the partial segments is established in accordance with processing options in the form of property classes. Following a predefined movement route or driving according to a random principle are described as processing options. In a fourth step, the sequence of the processing of the individual segments is established by the controller, for example, so that the shortest routes between the individual segments are achieved. In addition to the large amount of computing effort and storage expenditure, a large time expenditure also results in the case of partial segments having random driving directions.

WO 2016/091312 A1 describes for driving on a surface according to a random principle (random direction upon leaving a boundary which is reached), the allocation of the surface into partial surfaces to ensure that areas which are difficult to reach are reached better and left again using random movements. The restriction of the random movements to a partial surface is established for dwell times associated with the partial surfaces. In order that the robot intentionally leaves the partial surface after passage of the respective dwell time, a wire is laid along the surface boundary, which the robot follows until reaching the next partial surface. Instead of the dwell time established for dwelling on a partial surface, a signal originating from a user or from the charging station can also trigger the change to another partial surface. In this solution, both driving the partial surfaces according to the random principle and also changing to another partial surface by a drive along the boundary of the overall surface are time-consuming. The change to another partial surface via a drive along the edge of the overall surface restricts the establishment of reachable partial surfaces.

EP 2 752 726 B1 describes a solution which cleans, for example, store surfaces, on which display stands, guide signs, pallets, containers, or products are differently arranged directly again and again. The respective new situations do not have to be mapped for the automatic cleaning. Replaceable objects and also the boundary of the floor are treated as obstacles and are therefore always detected when the floor treatment machine encounters them. For the treatment of the surface, a treatment direction is established, from which spaced-apart driving lines perpendicular to one another result, wherein the travel directions on adjacent driving lines are oriented in opposite directions. Route segments from starting points to end points are followed on the driving lines in each case until reaching an obstacle. At an end point, a contour-following movement is triggered to find a new starting point, during which the floor treatment machine follows the obstacle until it encounters a driving line. When traveling along driving lines and during contour-following movements, the current position and orientation of the floor treatment machine is provided by a position detection device.

It has been shown that the solution according to EP 2 752 726 B1 is well suitable for a standard treatment of a coherent surface to be treated. If the surface to be treated is not coherent and if the cleaning sequence has to be adapted to time specifications and/or to regionally differing cleaning requirements, this is thus linked to an increased operating effort.

Automatic floor treatments are not limited to cleaning. For example, a treatment, such as the polishing of the floor surface or the application of a surface coating, can also be carried out by an automatic floor treatment machine. The term floor treatment also includes controlling the floor surface or carrying out measurements, respectively, on the entire floor surface. Such measurements can be associated with treatments on selected locations. Floor surfaces do not only refer to surfaces in rooms, but also to surfaces outside, wherein positioning areas can then surely be provided for the position determinations instead of the walls, columns or other orientation elements, so as to carry out distance measurements thereon. The floor treatment outside can comprise everything ranging from mowing lawns, working soil, fertilization, sowing, weed treatment, harvesting, to searching for metal parts or even mines.

The task according to the invention now lies in finding a simple solution, which is associated with the smallest possible effort for the detection, the storing, and for the treatment movement. Moreover, the solution is also to be able to be used with little operating effort if the area to be treated is not coherent and/or if the cleaning sequence has to be adapted to time specifications and/or to regionally differing cleaning requirements or space conditions.

The task is solved by means of a floor treatment machine comprising the features of claim 1, by means of a method comprising the features of claim 10 and by means of a computer program product comprising the features of claim 14. The dependent claims describe alternative or advantageous embodiment alternatives, respectively, which solve further tasks.

When solving the task, it was recognized that there are many situations in which a surface cannot simply be treated in a treatment procedure essentially progressing in one direction. For example, if large sales surfaces comprise areas having different products, it can be that fresh products are filled into the shelves in the morning in one area and therefore in this time travel of a cleaning machine obstructs the filling work, and/or the cleaning machine is obstructed from sufficient progress by the filling work. In areas without refilling work, a cleaning machine could be used much more efficiently, wherein these areas can be formed both by areas of the sales surface without filling work or also by other rooms in the same building. Moreover, it can be that a floor area has to be cleaned after the refilling work, for example, because soiling originates from the refilled products.

Differently soiled areas can occur even on large coherent floor surfaces without obstacles, for example, gymnasium areas at the circles in front of handball goals. Such areas can make cleaning twice or multiple times necessary. It has been recognized in the scope of the invention that more intensive cleaning of specified areas is to be enabled without the entire surface being cleaned equally intensely. For floor surfaces having traversable minimal obstacles, such as protruding guidelines for the blind, the solution according to the invention is to avoid passing cleaning movements because disturbances on a treatment area abutting the floor can occur during the passing over.

It has been recognized that it is important for the treatment flexibility required in the above examples that zones can be determined which are treated in succession. Moreover, it has been recognized in the scope of the invention that the effort required for the treatment of zones remains as low as possible if the controller does not have to compute routes optimized with great effort in each case for determined zones. Passing over the zones according to a random principle is precluded because of the large time expenditure. The solution according to the invention comprises a zone formation, a driving solution inside the zones, and the change from one zone to another zone.

The controller according to the invention of the treatment machine and the method according to the invention and the computer program product which enable carrying out a method respectively comprise a planning mode, which permit the determination of at least two zones on a floor surface to be treated, a first node in each zone, and a connecting route from at least one zone to a first node of another zone. To determine a zone, at least one section of its zone boundary can be entered as a virtual obstacle, so that a direct connection between the first node of the determined zone and the first node of another zone from the entered section of the zone boundary is interrupted because of real and virtual obstacles.

The treatment mode of the treatment machine or the method prevents a change of the floor treatment machine from a current zone under treatment to another zone to be treated because of real and virtual obstacles. A drive from this current node to the first node of the other zone to be treated is first made possible when the current zone has been essentially completely treated. The effect of a section of the zone boundary of the current zone arranged between the first node of the two zones as a virtual obstacle can then be canceled. It is apparent that in addition to the complete treatment, additional criteria can also be provided for permitting a drive out of the current zone, for example, a specifiable time.

An efficient complete treatment of a zone without routes to be established by the controller can be achieved using the following procedure. Proceeding from the node point of a zone, driving lines spaced apart from one another and perpendicular to a treatment direction of this zone are established, wherein the driving directions are oriented in opposite directions on adjacent driving lines. Route segments from starting points to end points are followed each of the driving lines until reaching an obstacle. At an end point of a route segment, its starting point, its end point, and one of the states "completely treated" or "incompletely treated" and also, at least in the case of "incompletely treated" in addition direction information are stored. It can be inferred from the direction information in which direction incompletely treated regions exist proceeding from the corresponding end point.

The state to be associated with a current end point "completely treated" or "incompletely treated" is preferably determined on the basis of the distance from the current end point to the closest starting point on a driving line which is located in the current orientation of the treatment direction directly in front of the driving line having the current end point, wherein the state "incompletely treated" is selected in the case of a distance above a specified value. The specified value preferably corresponds to at least the extension of the floor treatment machine transverse to its travel direction, so that "incompletely treated" is selected if the floor treatment machine has sufficient space for through travel between the current end point and the closest starting point on a driving line in front of the driving line having the current end point. This possible through drive is not yet sought out on the basis of the current orientation of the treatment direction. With the storage of the specification "incompletely treated" carried out at the current end point and the direction information, from which it can be inferred in which direction an incompletely treated area exists proceeding from the current end point, the untreated area can be approached at a later time from this end point in the modified direction.

At an end point, a contour-following movement is triggered to find a new starting point until the floor treatment machine follows the obstacle until in encounters a driving line, wherein the contour-following movement begins in the direction of the respective current orientation of the treatment direction. If in this case the driving line driven before the contour-following movement is encountered on a route segment which has not yet been followed, a new starting point is established there and the driving direction of this driving line is maintained. If an adjacent driving line is encountered on a not yet traveled route segment, a new starting point is established there and the travel direction of this adjacent driving line is selected. If a driving line is encountered on an already followed route segment, the end of a group of route segments extending adjacent to one another is established and an end point having the state "incompletely treated" is sought to engage in a new group of route sections extending adjacent to one another from this end point in the orientation of the treatment direction stored for the end point until an end point having the state "incompletely treated" is no longer present.

If an end point having the state "incompletely treated" is no longer present in the current zone after traveling this zone, a drive from this current zone to the first node of the other zone to be treated can be enabled, because then the current zone is essentially completely treated. After reaching the first node of the other zone to be treated, at least one area of the zone boundary of the other zone to be treated is used as a virtual obstacle, so that an exit from the other zone to be treated is prevented until it is completely treated. The beginning of the treatment of the new current zone can optionally also be dependent on still further conditions, for example, a specified time.

The solution according to the invention enables a floor treatment for freely selectable zones, which does not compute routes on surfaces to be treated and also does not execute random routes. Simple and secure treatment of the zones in succession is enabled with minimal travel and storage steps. The boundary of the floor surface and the zone boundary of the respective current zone is treated as a real or virtual obstacle and is therefore always detected when the floor treatment machine encounters it.

Real obstacles and thus also the floor boundary, are preferably detected by means of distance measurements by a scan sensor of the floor treatment machine, wherein the scan sensor is arranged in particular in front of the drive wheels, substantially in the height area of the drive wheels. In the case of a preferred embodiment, a laser scanner is used, which covers an angular range of 270°.

So that real obstacles or floor boundaries, which do not extend across the height area with the scan sensor, are also detected, other sensors are preferably also used for recognizing obstacles. The floor treatment machine comprises ultrasound sensors and/or infrared sensors, for example. The ultrasound sensors are preferably oriented such that they detect obstacles, which extend against the interior of the floor surface at a distance from the floor. The infrared sensors are preferably oriented towards the floor, so as to detect obstacles in the floor, in particular steps.

To recognize obstacles, the floor treatment machine can also comprise at least one contact sensor, wherein preferably at least one deflection sensor is arranged between a chassis and a housing area, which is located in the front in driving direction. When an obstacle now comes into contact with the housing area, which is located in the front, the obstacle is recognized, the floor treatment machine is stopped, and the detected obstacle is bypassed.

In addition to the physical obstacles, the obstacles also comprise virtual obstacles, such as the above-mentioned regions of the zone boundaries or open doors, for example, which are not to be driven through. In the case of a preferred embodiment, the virtual obstacles are input via a controller for the floor treatment machine and have the same effect as real obstacles.

During driving along driving lines, during the contour-following movements, and during the drive to the first node of another zone, the current position and orientation of the floor treatment machine is provided by a position detection device. During driving along driving lines, it is checked whether the current items of position information matches with positions on the current driving line. In the event of deviations, the driving movement is corrected accordingly. During the contour-following movements, the current items of position information are used to detect the encounter with a driving line. Because only the current or the next driving line can be encountered during the contour-following movements, only items of information for two driving lines have to be provided. When following the contour of an obstacle, moreover the data on the obstacle or its detection have to be used.

If the floor treatment machine encounters a driving line at an encounter point during a contour-following movement, it has to be checked whether this encounter point is located on an already traveled route segment. For this purpose, it can be checked using the current items of information of the route segment memory whether the encounter point lies on a line between a pair of stored starting and end points. Because of the small quantity of data of the route segment memory, the reading and comparison effort for checking the encounter point with respect to its possible location between stored starting and end points is also very small.

During the drive along driving lines, during the guiding through contour-following movements, and during drives to another zone, the requirements for the storage size and the computing power are low, because the current positions only have to be related to line equations and a small number of point pairs.

According to one preferred embodiment, in the planning mode, a treatment direction, which is used in the treatment mode, can be assigned to each first node and thus the zone which is associated with the first node. The driving lines each extend perpendicularly to the treatment direction. The positions of the first nodes and the associated treatment directions enable the treatment of all zones without an operator being required. It is to be assumed that the best treatment directions in a zone each extend parallel or perpendicular to a zone boundary. However, if large replaceable elements having differently oriented outer boundaries are arranged in the interior of a zone, it can thus be that a treatment direction adapted to these elements is also optimal. The solution according to the invention has the advantage that an operator can establish an optimum treatment direction in the planning mode with his experience and a rough judgment of the zones in consideration of the zone boundary and possibly existing replaceable elements.

The planning mode makes it possible to determine zones which are spaced apart from one another, adjoin one another, and also overlap, wherein at least one section of its zone boundary, preferably also the entire zone boundary, can be entered as a virtual obstacle for each zone, and of the virtual obstacles, in each case only those of the presently processed zone are active and therefore zone boundaries of other zones can be passed over.

In the treatment mode, the floor treatment machine is moved proceeding from the first node of a current zone. If an end point having the state "incompletely treated" is no longer present in the current zone after traveling this zone, the treatment machine preferably travels to the first node of the current zone. The change from the current zone to another zone then takes place by means of travel of the floor treatment machine from the first node of the current zone to the first node of another zone, wherein the floor treatment device is in a raised state on the travel between these two first nodes and therefore can also pass over irregularities without disturbance.

For floor surfaces having traversable minimal obstacles, such as protruding guidelines for the blind, preferably at least one zone boundary, but preferably the boundaries of two zones each located on one side, are laid along these minimal obstacles, so that these can only be passed over during the zone change and then with raised floor treatment device. Disturbances are thus avoided.

In one advantageous embodiment, the planning mode makes it possible to determine at least one further node and its sequence on the route between two first nodes and the treatment mode carries out the change from the current zone to another zone by means of a drive of the floor treatment machine via the at least one further node. With the determination of further nodes and a sequence, according to which they are approached, longer or more difficult routes to another zone can also be enabled. Further nodes can be laid on a passage route, in particular outside all zones to be treated. In the treatment mode, the opening of a door or the triggering of travel using an elevator can possibly be achieved at these further nodes. After the start of a treatment sequence, the floor treatment machine can approach and treat all building regions established in a sequence plan as zones to be treated. An operator is not required for the change from a treated zone to a next zone.

In the planning mode, a change route between two first nodes can be associated with one or both connection directions and in the treatment mode the change route can accordingly be traveled in one or in both connection directions. It is easily possible to store various sequences, which are created in the planning mode, of zones to be treated in succession. These sequences are available for selection for the treatment mode and are selectable by the operator, for example, via a touchscreen. The solution according to the invention ensures the greatest possible treatment reliability with minimal specifications and calculations.

A floor treatment machine or a method comprising the above-listed driving steps and stored information, respectively, can be operated successfully, when, if required, thus in particular when storing starting points and end points as well as in response to controlling the position and orientation relative to driving lines, the position and the orientation of the floor treatment machine can be determined.

According to the most general embodiment of the invention, a position and orientation detection device provides the current position and orientation upon request. Any position and orientation detection device, which is known from the prior art, can thereby be used.

Total stations comprising an automatic target acquisition and target tracking (for example the standard product known as Leica iCON robot 50) are known from the surveying technology. In the event that such a total station is now arranged so as to be stationary in the area of the floor surface, which is to be treated, the floor treatment machine can obtain its position and orientation from the total station via a radio connection, if needed. In the event that the floor treatment machine comprises two prisms, for example, which can be traced by the total station and which are arranged so as to be offset on the upper side thereof, the position and orientation of the floor treatment machine can be determined from the positions of these two prisms.

Laser tracker-based position and orientation determinations (for example the 6DoF Leica Absolute Tracker AT901) are also known from the robot control. A laser tracker can be integrated in the floor treatment machine and ensures position and orientation determinations with a high accuracy.

It goes without saying that stationary position determination devices for detecting the floor treatment machine as well as measuring systems, which are arranged on the floor treatment machine and which follow stationary elements, can be used. Due to the fact that the view of identification marks on the ceiling is possible for the most part from a large room area, measuring systems arranged on the floor treatment machine, which are orienting themselves or the coordinate system, respectively, by identification marks on the ceiling, are suitable.

In a preferred embodiment, stationary components of the position and orientation detection device are foregone. This creates a completely autonomous device, which can be used on all kinds of floor surfaces, wherein individual fixed elements, such as wall sections bounding the floor surface or elements, columns, inner wall sections or fixed shelves, which are arranged on the floor surface and which are used as positioning areas, must be assigned to the floor surface. To provide for a position and orientation determination, the controller of the floor treatment machine ensures that a detection mode can be carried out, in which the detection of positioning areas can be carried out in a floor coordinate system, which is assigned to the floor surface, from distance measurements of the scan sensor and from drive information from the drive wheels.

Before a floor surface can be treated by the floor treatment machine, the floor treatment machine must be guided across different areas of the floor surface in the detection mode, so that the floor treatment machine can detect positioning areas. For detecting the positioning areas, the detection mode ensures that line segments can be determined in the floor coordinate system, wherein the determined line segments represent measured distance points at the positioning areas comprising parameters of curve equations as sections of continuous lines.

In the treatment mode, the floor treatment machine ensures that its position and orientation can be determined in the floor coordinate system from the detected positioning areas and the distance measurements from the scan sensor, which are detected for the current position. If necessary, driving information from the drive wheels is also used for determining a current position and orientation of the floor treatment machine. Based on an accurate position determination, which follows from a good correlation of at least two positioning areas, for example, and the distance measurements, which are detected for a current position, a relatively accurate position and orientation can also be determined while continuing the drive when following the route or with the drive information from the drive wheels, respectively, even if positioning areas are not visible when continuing the drive.

In a preferred embodiment, the effective expansion of the housing and/or the effective location of the treatment area relative to the wheels are/is considered and a passing by, which is as accurate as possible, and guiding of the treatment area at the obstacle is thereby attained in light of the effective distance measurements to an obstacle.

A preferred floor treatment device is embodied as cleaning device, preferably comprising at least one brush, a cleaning liquid supply and a suction arrangement, but if necessary comprising a dry vacuum, or a spray suction device or a sweeper. At least one tank and at least one pump must be provided for the cleaning liquid. Preferably, there is one tank for cleaning liquid or water comprising a cleaning agent, respectively, and one tank for the cleaning agent, which is added to the water. To be able to forego a frequent replacement of the cleaning liquid, a membrane is assigned to this tank. The membrane serves as flexible wall between fresh and dirty water, wherein the available space is divided for fresh and dirty water, as needed. The drive device comprises at least one battery and at least one drive motor. The controller comprises a display and an input device, preferably a touch screen. To be able to turn off the floor treatment machine quickly in case of an emergency, a well-visible emergency stop switch is also provided.

The drawings explain the invention by means of an exemplary embodiment, to which the invention is not limited, however.

FIG. 1 shows a perspective illustration of an automatic cleaning machine,

FIG. 2 shows a lateral view of an automatic cleaning machine,

Figure 6:
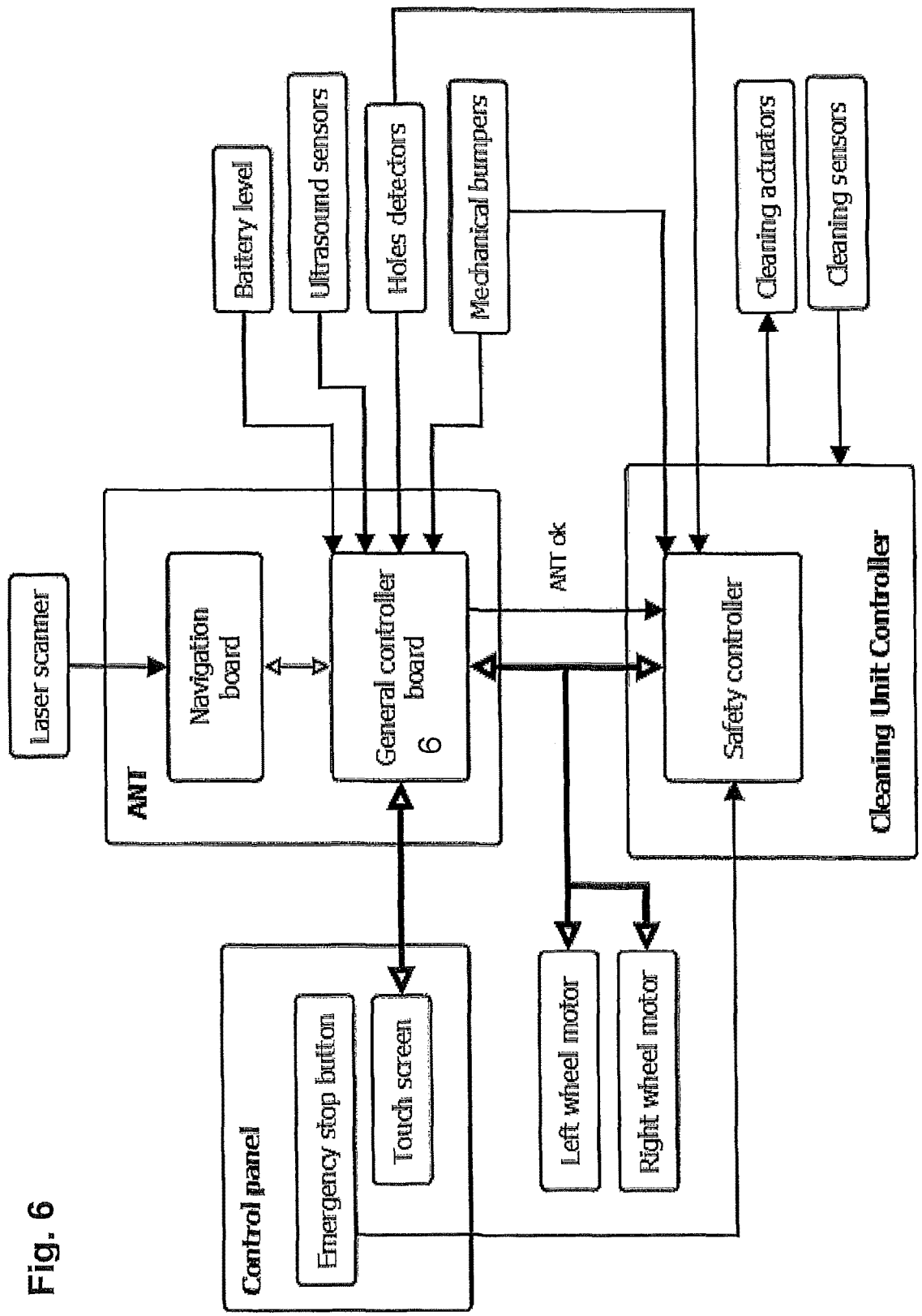
Figure 7:
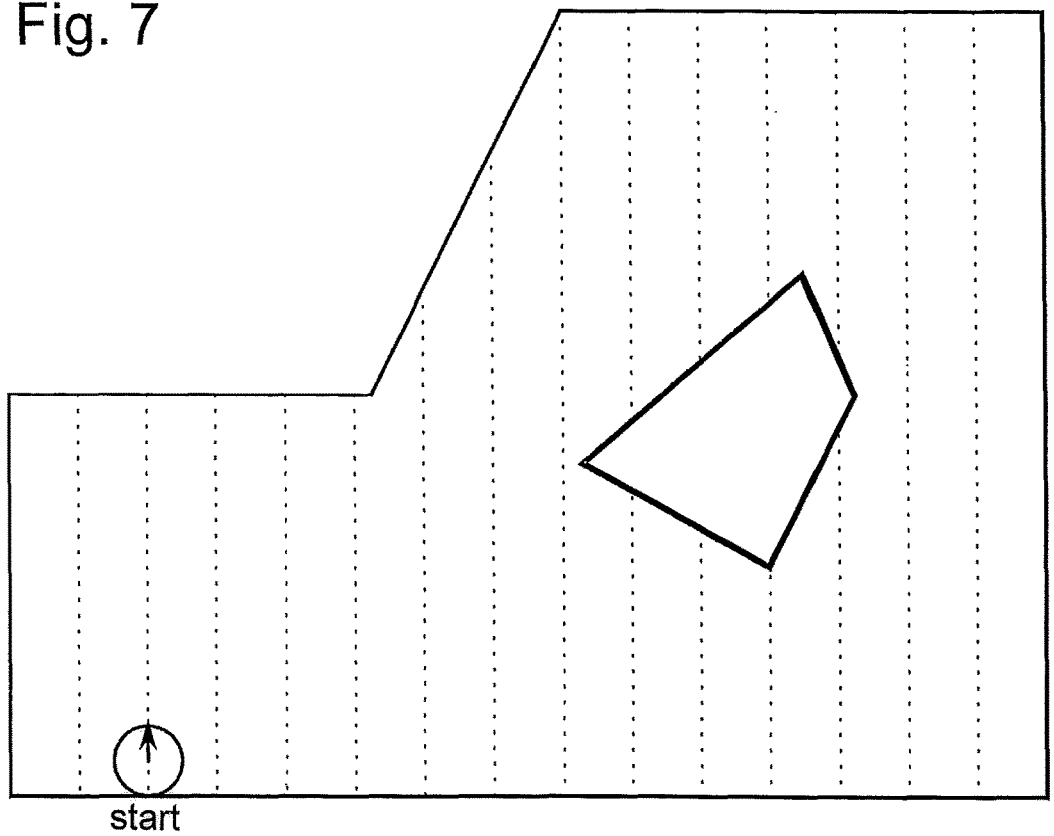
Figure 12:
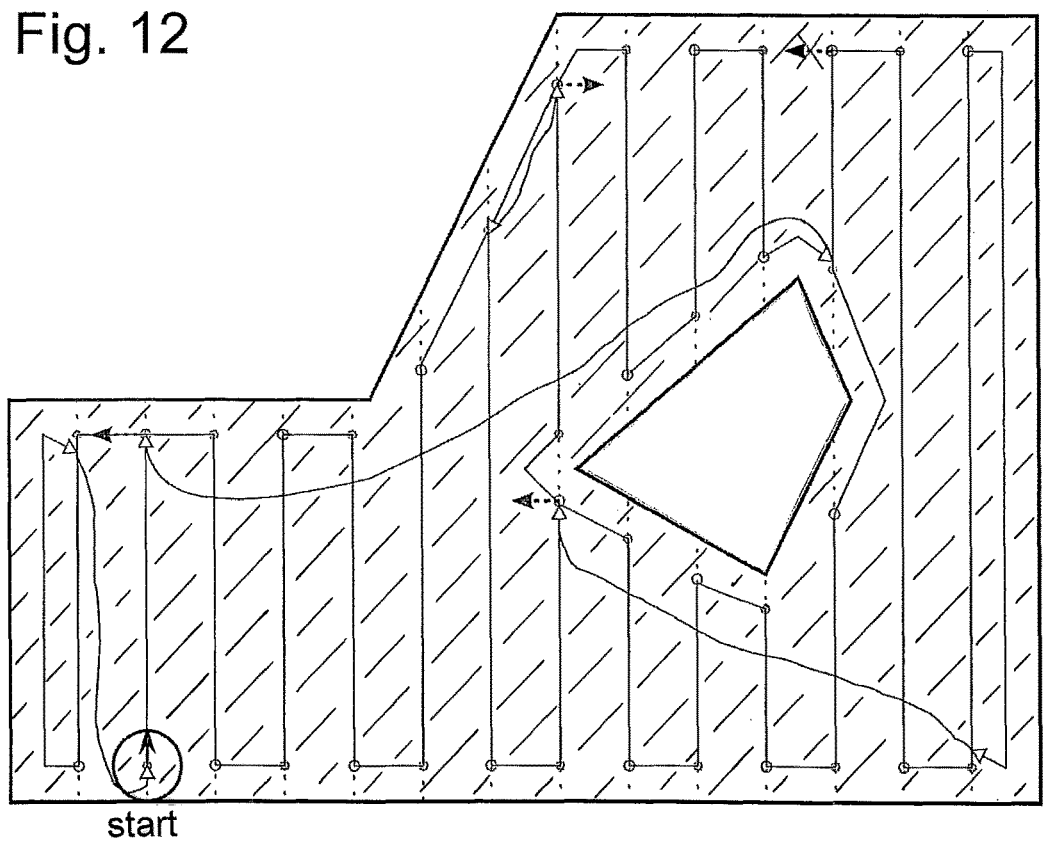
Figure 13:
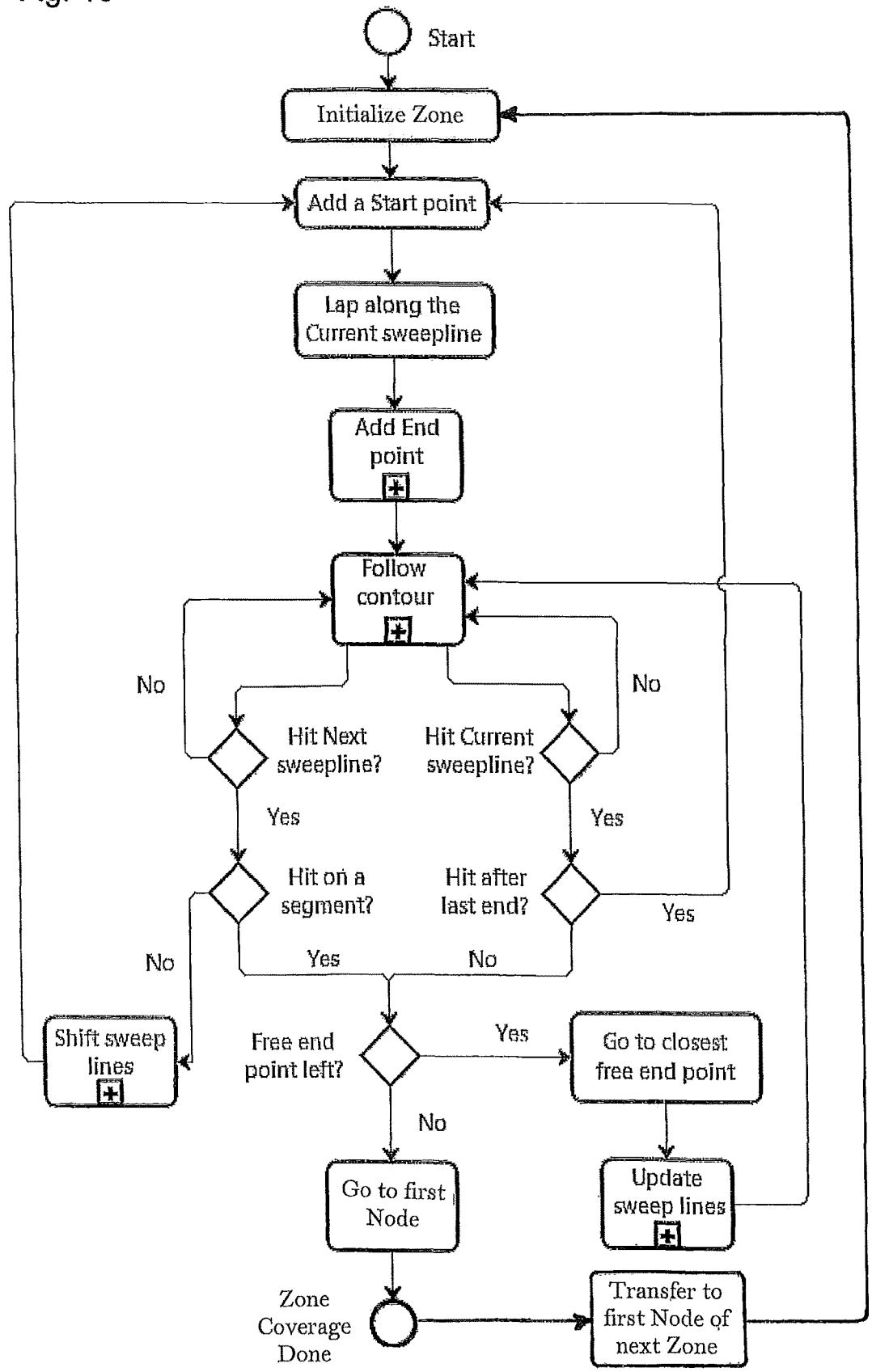
Figure 14:
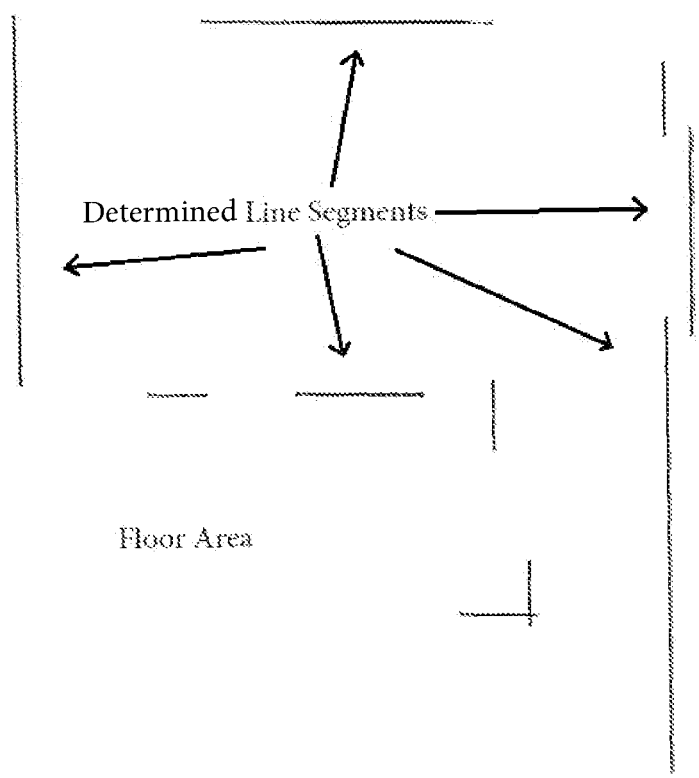
Figure 15:
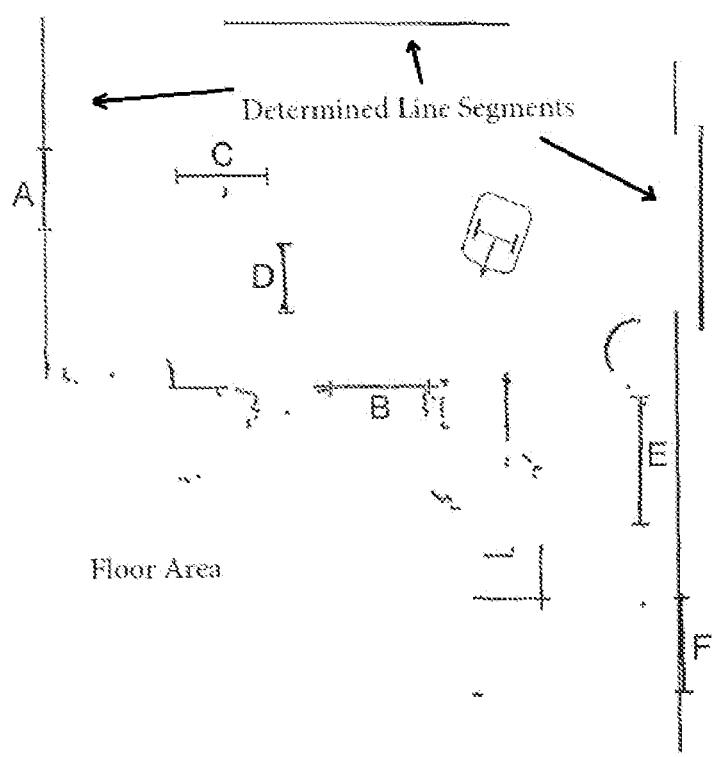

FIG. 3 shows an illustration according to FIG. 1, but with a housing front, which is swung open, FIG. 4 shows a perspective illustration of the housing front, which can be swung open, FIG. 5 shows a bottom view of the automatic cleaning machine, FIG. 6 shows a schematic compilation of the most important elements of the controller, of the sensors, and of the drive of the automatic cleaning machine, FIGS. 7 to 12 show schematic illustrations for floor treatment of a zone, FIG. 13 shows a flow chart for the floor treatment, FIG. 14 shows line segments, which are illustrated in a coordinate system and which are determined in a detection mode from distance measurements from the scan sensor and driving information from the drive wheels to positioning areas, and FIG. 15 shows line segments according to FIG. 14, which are illustrated in a coordinate system, and distance points detected from an indicated position of the floor treatment machine, which overlap the line segments, and the lines of currently current elements, which can be placed through the distance points, and FIG. 16 shows a schematic illustration of a plan created in the planning mode.

As an example for a floor treatment machine, FIGS. 1 to 3 and 5 show a cleaning machine 1 for treating floor surfaces, comprising a housing 2, two drive wheels 3, two pivotable support wheels 4, a drive device 5 in each case comprising a motor for each drive wheel 3, a controller 6 comprising a display and input device 7 in the form of a touch screen, at least one scan sensor 8, which ensures that distance measurements can be carried out in a substantially horizontal plane via a predetermined angular area and comprising a floor treatment device 9, which ensures that the floor can be treated in a treatment area comprising a predetermined location relative to the wheels 3, 4 as well as comprising a treatment width perpendicular to the driving direction.

The floor treatment device 9 of the illustrated cleaning machine comprises two or three replaceable brushes or pads 9a, which rotate about vertical axes, which are arranged so as to be laterally offset. The brushes 9a are rotated by a brush drive 9b. By means of a non-illustrated cleaning liquid supply, cleaning liquid is supplied in the area of the brushes 9a from a first tank 10 by means of a pump. From a second tank 11, cleaning agent can be introduced into the cleaning liquid. After the brushes 9a have treated the floor, cleaning liquid, which remains on the floor, is sucked up by a suction arrangement 12, and is supplied to the first tank 10. To be able to forego a frequent replacement of the cleaning liquid, a membrane, which keeps undesired components in the first tank 10, is assigned to the first tank. The electrical energy of all of the electrically operated components stems from at least one rechargeable battery 13, which can be connected to a charging device via a plug 13a. The extraction arrangement 12 is preferably arranged on the chassis 14 so as to be slightly pivotable via an updating connection 12a, so that the suction arrangement 12 is always assigned to the wet floor surface, even when driving around curves.

Due to the fact that the brushes 12 are arranged so as to be slightly offset to one side relative to a central axis in driving direction of the cleaning machine, the cleaning takes place on this side substantially into the area comprising the drive wheel 3. So that the drive effect of the drive wheel 3 is not impacted by the cleaning liquid, a scraper 15 deflects the cleaning liquid against the center of the cleaning machine 1.

So that obstacles or wall boundaries, which do not extend across the height area with the scan sensor 8, are also detected, other sensors are preferably also used for recognizing obstacles. In the illustrated embodiment, a plurality of ultrasound sensors 16 are arranged in the front area of the housing 2, wherein the arrangement on two different heights and the possibility of transmitting ultrasound pulses from any ultrasound sensor 16 and to receive them at any ultrasound sensor 16, ensures a good detection of obstacles, which extend at a distance to the floor towards the interior of the floor surface. Obstacles in the floor, in particular stairs, are detected by means of two infrared sensors 17, which are in each case arranged laterally on the front and which are oriented towards the floor.

To recognize obstacles, provision is also made for at least one contact sensor 18 in the form of a deflection sensor, which is arranged between the chassis 14 and a housing area 2a, which is located in the front in driving direction. In the event that an obstacle now comes into contact with the housing area 2a, which is located in the front, the obstacle deflects the housing area 2a relative to the chassis 14, which is detected by the deflection sensor.

To obtain easy access to the interior of the cleaning machine for maintenance work, the chassis 14 is connected via a pivot connection 19 to a housing bracket 20 for holding the housing area 2a, which is located in the front. Spring connections 21, which hold the housing area 2a, which is located in the front, in a position of equilibrium, from which said housing area 2a is deflected when coming into contact with an obstacle, are arranged between the housing bracket 20 and the housing area 2a, which is located in the front, wherein the contact sensor 18 between the housing bracket 20 and the housing area 2a, which is located in the front detects this deflection. So that the scan sensor 8 has an unobstructed view in the scan area, the housing area 2a encompasses a passage slot 2b. A warning lamp and/or an emergency stop switch 22 are/is arranged on the upper side of the housing 2.

FIG. 6 shows that at least a part of the controller 6 is connected substantially to all of the sensors and drives. For the navigation, the part of the controller 6 in the form of the "general controller board" is connected to a "navigation board", which, in the illustrated embodiment, is connected directly to the scan sensor "laser scanner". It goes without saying that navigation solutions can also be used, which operate without a scan sensor (for example positioning by means of total stations or laser trackers), wherein the scan sensor "laser scanner" is then connected directly to the "general controller board" for detecting obstacles.

For detecting obstacles, the "general controller board" is connected to at least one sensor from the group of scan sensor "laser scanner", ultrasound sensor "ultrasound sensors", infrared sensor "holes detectors", contact sensor "mechanical bumpers". In the event that an obstacle or an emergency situation, respectively, is only detected by means of the contact sensor "mechanical bumpers", the infrared sensor "holes detectors", or the emergency stop switch, it is advantageous when these elements are connected directly to a safety controller "safety controller", which can trigger an immediate stop of the drive wheels, so as to avoid damages. The safety controller and the controller 6 are connected to one another and to the drive device, wherein the drive device preferably comprises one motor each for both drive wheels.

A part of the controller 6 is connected to the display and input device "touch screen". In the illustrated embodiment, the controller for the floor treatment device 9 is arranged in a cleaning controller "cleaning unit controller", which is connected to the controller 6 and to the actuating elements "cleaning actuators" and sensors "cleaning sensors" of the floor treatment device 9. The controller preferably comprises a part for the planning mode which runs on a computer (not shown) having a sufficiently large display screen. The zone boundaries, the first nodes, the treatment directions, and the connection routes between the zones can be input on the computer (not shown) and made accessible as a sequence to the "general controller board".

FIGS. 7 to 12 use an example to describe the significant steps and the information of a possible route on a zone. The figures illustrate consecutive situations of the floor treatment within a zone boundary. The flow chart of FIG. 13 combines the controls, decisions, and driving steps, which are minimally required for the routes.

At the beginning of the floor treatment or of a route (FIG. 7), respectively, the floor treatment machine is on the first node, which is identified with start. The travel direction shown by a solid arrow results from the treatment directions specified in the planning mode having forward and reverse orientation. On the route, it must be possible to provide information for three driving lines, which are located next to one another, for controls, decisions, and for values, which are to be stored. The driving lines (dotted lines in FIG. 7) are located next to one another at predetermined intervals and are preferably fixed as straight lines or by means of linear equations, respectively, in the floor coordinate system.

When the floor treatment machine is on its way on a driving line in the treatment mode, these driving lines and the driving lines, which are arranged on both sides, are identified as prior, current and next driving line, arranged in the forwards orientation of the treatment device. En route, the floor treatment machine drives route segments on the driving lines from starting points to end points, wherein the driving direction of the route segments, which immediately follow each other, on different driving lines is always fixed in the opposite direction. The end points are determined when proceeding on the respective driving line is not possible due to an obstacle. The starting points are determined as points on a driving line, in the case of which the floor treatment machine starts to pass over a route segment on this driving line. By storing the coordinates of the starting and end points, the treated area of the floor surface can be recorded.

In the initialization step "initialize zone", which is listed in FIG. 13, at a first node of a zone with the determination of the treatment direction, the position of the floor treatment machine on the first node is controlled and the specified treatment direction is retrieved. Subsequently, the starting point is fixed and stored as start point "add a start point". Starting at the first starting point, the first route segment is driven on the current driving line, which is identified in FIG. 13 with "lap along the current sweepline". When striking an obstacle, one end point on the current driving line is established and stored, which is illustrated in FIG. 13 with "add end point" and in FIG. 8 with circular points. In addition to the coordinates of the end point, the determination and storing of one of the states "completely treated" or "incompletely treated" also belongs to the storing of the end point and, in the case of "incompletely treated" the storing of a direction information also belongs thereto, wherein it follows from the direction information, in which direction incompletely treated areas in this zone are present, starting at the corresponding end point.

In the event that an area of the floor surface, which has not yet been treated, can be approached in the direction, which is opposite to the current orientation of the treatment direction, the distance from the current end point to the closest starting point on the prior driving line is located above a predetermined pass-through distance, which corresponds substantially to the minimally required width of an area, which can be passed over by the floor treatment machine. Starting at the end point of the first route segment in FIG. 8, no starting point is found on the prior driving line, because the prior driving line was not passed over. The distance from the first end point to a point, which is nonexistent, is determined so as to be larger than the predetermined pass-through distance and, accordingly, the state "incompletely treated" is stored for the first end point with the information that the area, which has not yet been treated, must be approached from the current end point with an orientation of the cleaning direction, which is opposite to the current treatment direction, which is illustrated in FIG. 8 with the dotted arrow, which points to the left, in the case of the first end point.

The obstacle, which is encountered at an end point, in each case triggers a contour-following movement, which is identified in FIG. 13 with "follow contour". During the contour-following movement, the floor treatment machine follows the obstacle in the direction of the respective current orientation of the treatment direction, until it encounters the current or the next driving line. This is identified in FIG. 13 with "hit current sweepline?" or with "hit next sweepline?", respectively. At the location, where the contour-following movement encounters a location of a driving line, which has not yet been passed over, a new starting point is determined (FIG. 13, "add a start point"). In the event that the new starting point is located on the current driving line or on the driving line, over which the contour-following movement passes, respectively, the driving direction of this current driving line is maintained. In the event that the new starting point—based on the driving line, which is passed over prior to the contour-following movement—is placed on the next driving line, this next driving line becomes the current driving line and the driving direction is rotated by 180° or is directed in the opposite direction, respectively, as compared to the prior driving line. In addition, the driving line prior to the contour-following movement becomes the prior driving line and a new next driving line is determined, which is identified in FIG. 13 with "shift sweep lines".

Figure 8:
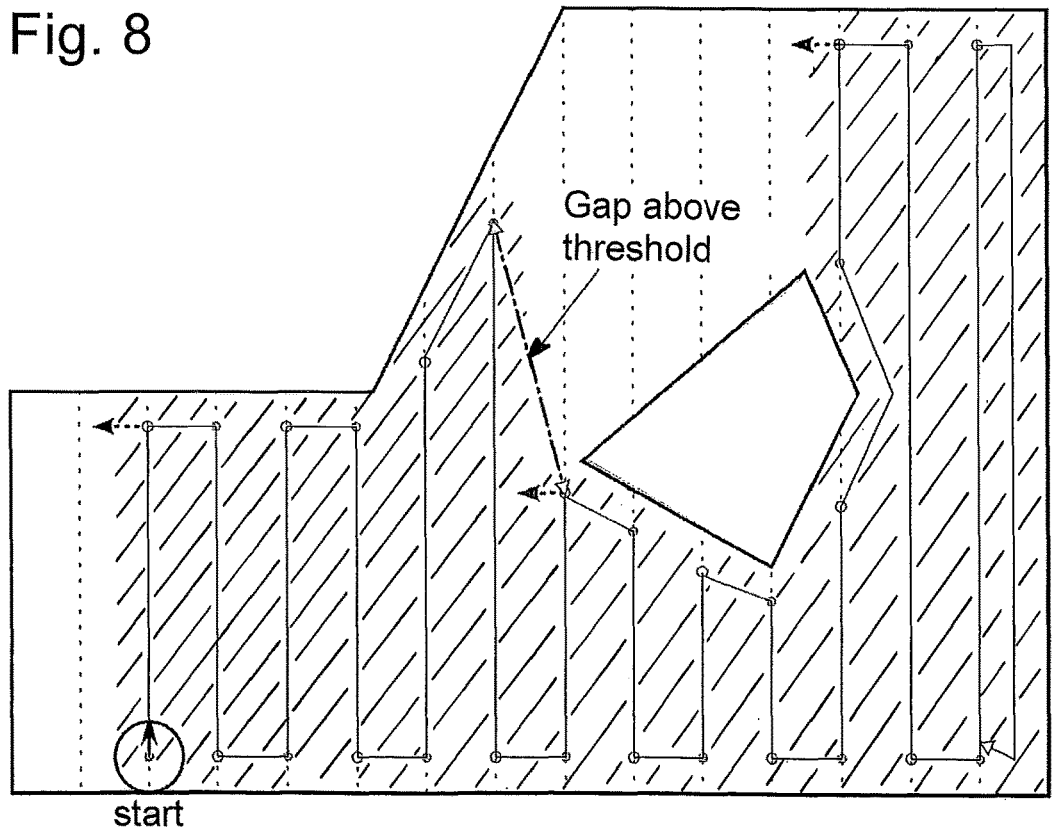

According to FIG. 8, the floor treatment machine always encounters the next driving line in response to the contour-following movement, which follows the first 10 end points, and, accordingly, the route segments, which immediately follow one another on the driving lines, always have opposite driving directions. The end points are first provided by the boundary of the floor surface. Accordingly, the distances between the end points and the respective closest starting point on the respective prior driving line are smaller than the predetermined pass-through distance, so that the state "completely treated" is stored at these end points. The seventh end point is provided by an obstacle, which is marked in black, on the interior of the floor surface. In the case of this seventh end point, the distance to the closest starting point on the prior driving line is larger than the predetermined pass-through distance, which is identified with "gap above threshold". Accordingly, the state "incompletely treated" is stored for the seventh end point with the information that the area, which has not yet been treated, must be approached from the current end point with a cleaning direction, which is opposite the current orientation of the treatment direction, which is illustrated in FIG. 8 by means of the dotted arrow, which points to the left, at the seventh end point.

Starting at the eleventh end point, the contour-following movement encounters the current driving line again after the obstacle, which is marked in black. Accordingly, the new route segment on the current driving line leads to the next or twelfth end point, respectively. In the case of this twelfth end point, the distance to the closest starting point on the prior driving line is larger than the predetermined pass-through distance. Accordingly, the state "incompletely treated" comprising the direction information according to the dotted arrow, which points to the left in FIG. 8, is stored for the twelfth end point.

The contour-following movement, which follows the fourteenth end point, only encounters a route segment which has already been treated. A section of a driving line, which has not yet been passed over, cannot be found. It follows from this that the first group of route sections, which run next to one another, has been completed.

Figure 9:
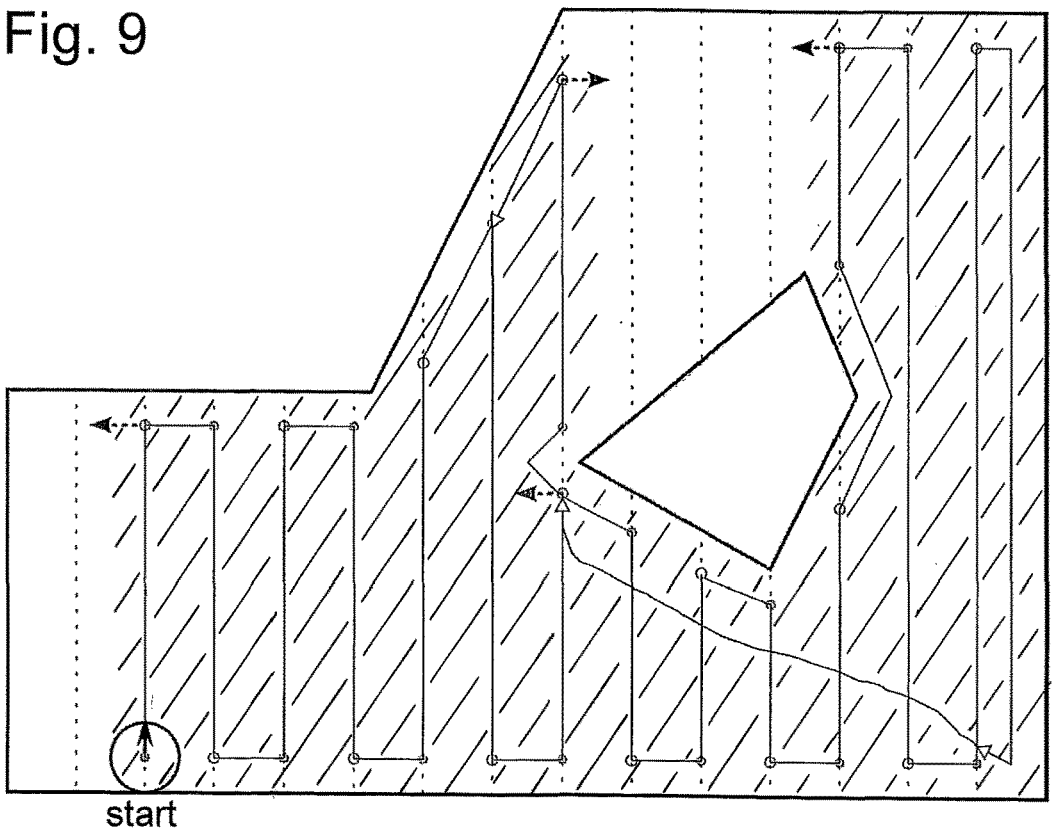
Figure 10:
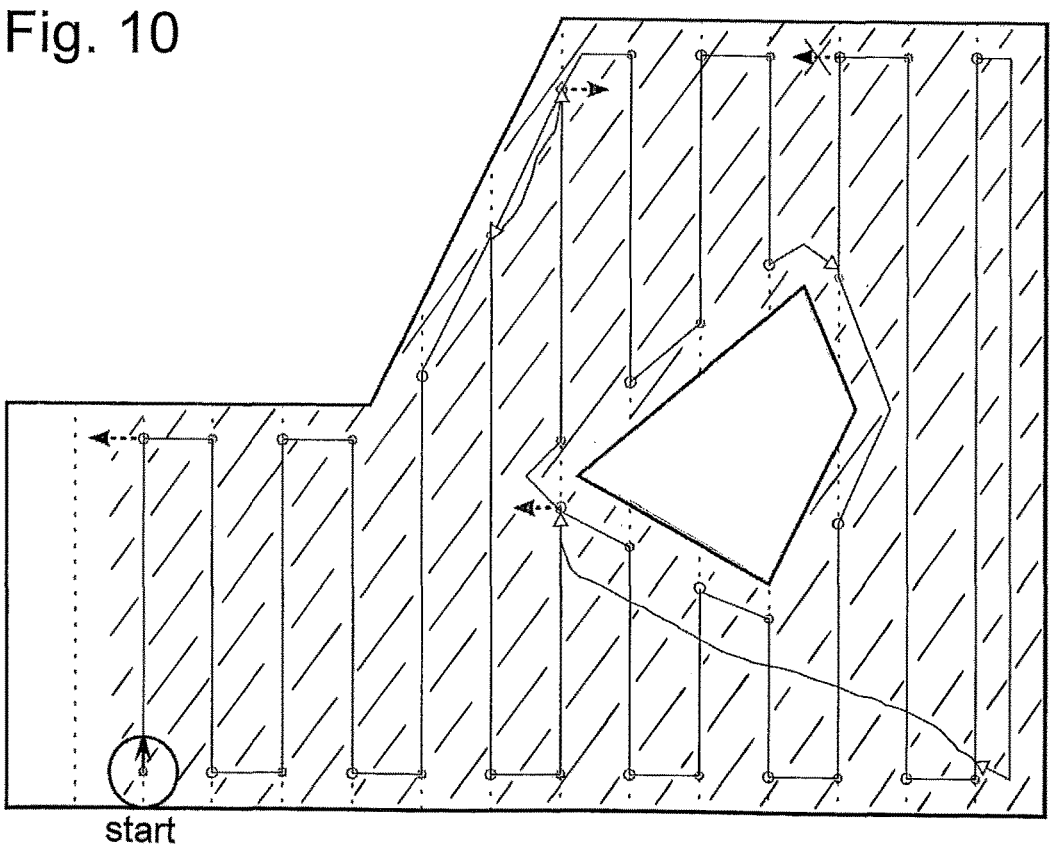
Figure 11:
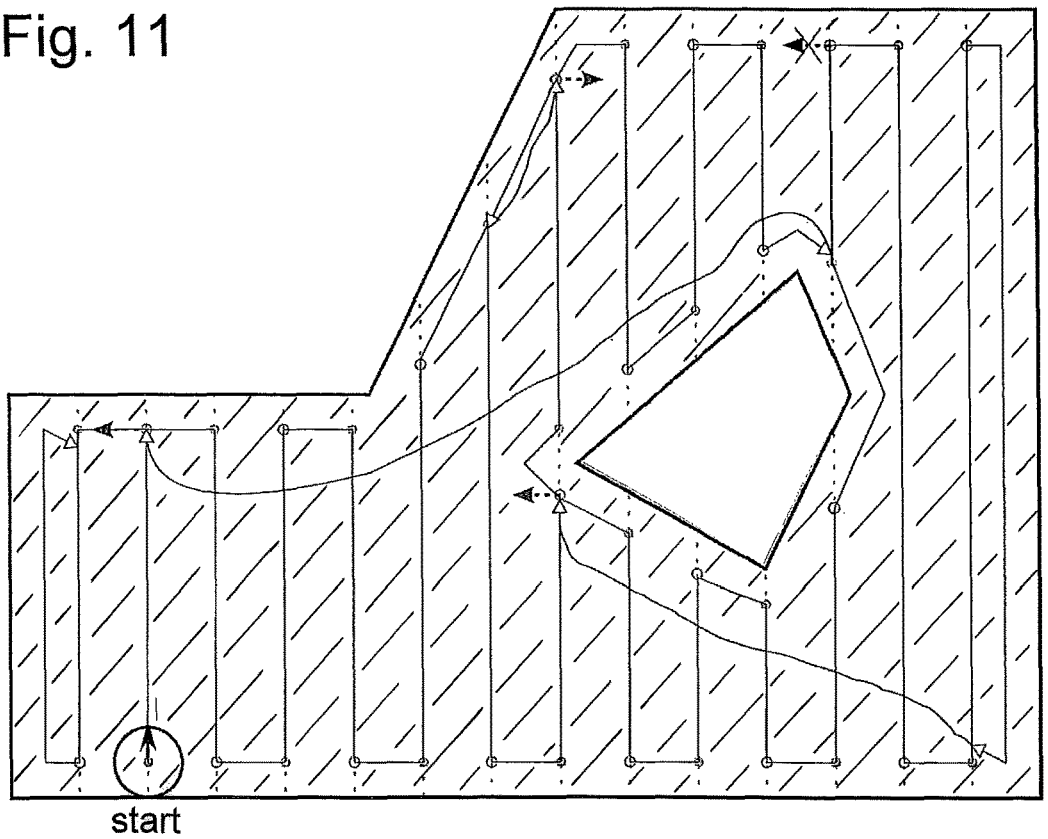

Passing over the further groups of route sections, which run next to one another, is illustrated in FIGS. 9 to 12. It is illustrated in FIG. 9, how, starting at the seventh end point, the contour-following movement comprising the orientation of the treatment direction, which is marked towards the left, after the obstacle, which is marked in black, encounters the current driving line again. The new route segment on the current driving line accordingly leads to the next end point, at which the distance to the closest starting point on the driving line located on the right or on the prior driving line, respectively, is larger than the predetermined pass-through distance. Accordingly, the state "incompletely treated" is stored for this end point with the direction information according to the arrow, which points to the right in FIG. 9. After the subsequent contour-following movement, the floor treatment machine encounters a route segment, which has already been treated, and, according to the FIG. 10, moves to the closest end pint comprising the state "incompletely treated". From there, the area above the obstacle, which is marked in black, is treated, and because the last contour-following movement arrives at a next driving line, which has already been treated with the same orientation of the treatment direction, the state of the end point, which is located at the upper end can be shifted to "completely treated" according to FIG. 11 and the last end point comprising the state "incompletely treated", namely the first end point, can be approached. FIG. 12 shows that the entire floor surface has been treated after the treatment of the floor surface to the right of the starting point of the floor treatment.

The position search movements between the groups of route segments, which are located next to one another, are in each case illustrated in FIGS. 9 to 12 by means of hand-drawn lines. For the point, which is to be approached, an advantageous route between starting and end points is in each case calculated, wherein hitting obstacles causes bypassing these obstacles.

All of the created groups of route sections, which run next to one another, are treated consecutively, in that an end point comprising the state "incompletely treated" is always sought at the end of such a group and is approached with a position search movement. Preferably, the closest end point comprising the state "incompletely treated" is chosen, which is identified in FIG. 13 with "go to closest free end point". FIG. 13 illustrates this iterative treatment with the term "is free end point left". At an end point comprising the state "incompletely treated", a current, a prior and a next driving line is determined in each case (FIG. 13, "update sweep lines") and, starting at this end point into the direction stored for the end point, a new group of route sections, which run next to one another, is tackled until no end point comprising the state "incompletely treated" is current anymore. The entire zone is then treated and the floor treatment machine goes to the first node of this zone. In FIG. 13, this is identified with "go to first node" and "zone coverage done". The subsequent change to the first node of a next zone to be treated is illustrated with "transferred to first node of next zone" and with the "initialize zone" carried out thereafter.

To ensure the complete treatment of a zone, only a few data, namely the starting and end points of the route segments, which are passed over, and a treatment state comprising direction information at the end points must be stored. In addition, no route must be planned except for the few position search movements, which are to be calculated roughly, which leads to a minimum calculating effort. When a zone is completely treated, a drive to the first node of a next zone to be treated and then the treatment of this next zone occur.

FIGS. 14 and 15 represent steps, which are carried out by an embodiment, which foregoes stationary components of the position and orientation detection device. Individual fixed elements, such as the wall sections, which border the floor surface, or elements, columns, inner wall sections or fixed shelves, which are arranged on the floor surface, and which are used as positioning areas, are assigned to the floor surface.

To provide for a position and orientation determination, the controller for the floor treatment machine comprises a detection mode, in the case of which the positioning areas, which are illustrated in FIG. 14 on a floor coordinate system, which is assigned to the floor surface, are determined from distance measurements of the scan sensor and from driving information from the drive wheels. Before a floor surface can be treated by the floor treatment machine, the floor treatment machine must be guided across different areas of the floor surface in the detection mode, so that it can detect positioning areas. To detect the positioning areas, the detection mode determines line segments in the floor coordinate system, wherein the determined line segments represent measured distance points at the positioning areas comprising parameters of curve equations, preferably straight lines, as sections of continuous lines. The illustrated sections of straight lines can be determined at angles to a coordinate axis and with position information as well as length information or also with the coordinates of the end points.

FIG. 15 shows the overlapping of detected positioning areas with the distance measurements of the scan sensor, which are detected for a current position, wherein distance points, which are located on a line, in particular a straight line, are illustrated with line sections A, B, C, D, E and F. From the illustrated correspondence of the line sections A, B and F with positioning areas, the position and orientation of the floor treatment machine can be determined in the floor coordinate system in the treatment mode. The line sections C, D and E originate from variable elements (obstacles), which were not present when carrying out the detection mode. If applicable, driving information from the drive wheels is also used to determine a current position and orientation of the floor treatment machine. All of the information, which can be used to determine the position, is preferably converted into a position and orientation determination with error estimation by means of Kalman filter technology. Based on an accurate position determination, which follows from a good correlation of at least two positioning areas, for example, and the corresponding distance measurements, which are detected for a current position, a relatively accurate position and orientation can also be determined while continuing the drive when following the route or with the drive information from the drive wheels, respectively, even if positioning areas are not visible when continuing the drive.

FIG. 16 shows a plan created in the planning zone having five zones 23-27. A first node 23a-27a is arranged in each zone 23-27. The zone boundaries 23b-27b are identified in accordance with the sequence of the zones 23-27 with one to five points and have to be fixed where they are not formed by a wall or another obstacle. Of the zone boundaries 23b-27b, at least one per region is usable as a virtual obstacle, so that in the treatment mode a direct connection between the first node of a zone and the first node of another zone is interrupted by the input region of the zone boundary because of real and virtual obstacles until the zone is completely treated. The virtual obstacle can then be canceled at least in a region of the zone boundary and the treatment machine can pass through this region to the first node of another zone.

The zone pairs 23 and 24 and also 24 and 25 are each fixed somewhat overlapping at a boundary. In the overlap area, for example, the zone boundary 24b is in the zone 23 and the zone boundary 23b is in the zone 24. The zone 27 is completely inside the zone 23. The zone 26 is spaced apart from all other zones 23, 24, 25, and 27. Because in each case only the virtual obstacles of the presently processed zone are active, the zone boundaries of other zones can be passed over. This ensures in the case of overlapping zones that a complete treatment can be ensured in the region of overlapping boundaries, and/or that no untreated narrow strips result.

In the planning mode, a treatment direction is associated with each first node and thus the zone in which the first node is arranged. The spaced-apart driving lines extending perpendicularly thereto can be derived from the treatment direction, wherein the driving directions are oriented in opposite directions on adjacent driving lines. In FIG. 16, driving directions 23c-26c and 27c derived from the treatment directions are shown at the first nodes, according to which the machine drives away from the first node in the treatment mode. The determination of the treatment directions thus corresponds to the determination of the driving directions 23c-27c at the first nodes and the information as to whether the treatment direction at the beginning of the zone treatment is oriented to the right or left at the first node in relation to the driving direction. The specification of the zone boundaries, the positions of the first nodes of the zones, and the associated treatment directions or driving directions enable the treatment of all zones without an operator having to be current at the start in another zone.

The connection routes 23d-26d to the first nodes 24a-27a of a respective following zone start from the first node of the respective current zone and each pass through a region of the zone boundaries of the two successive zones. If the direct connection between the first node of a current zone and the first node of a next zone is not drivable easily, at least one further node 28 can thus be determined on the route between two first nodes in the planning mode. If more than one further node 28 is determined, a sequence in which it is driven is thus assigned to the further node 28. The treatment mode carries out the change from the current zone to a next zone by means of a drive of the floor treatment machine via the at least one further node 28. Longer or more difficult routes to another zone can also be enabled by determination of further nodes and a sequence according to which they are approached. According to FIG. 16, the route from the zone 26 extends outside all zones to be treated, for example, in a corridor to the zone 27. If the opening of a door or travel using an elevator is possibly to be triggered at a further node 28, the required information for this purpose can thus be assigned to the further node 28, which has the result that the treatment machine outputs a signal and drives through the door or into the elevator as soon as this is possible.

The invention claimed is:

1. A floor treatment machine for treating floor surfaces, comprising:
    a housing, two drive wheels, at least one support wheel, a drive device, a controller, at least one obstacle-recognizing device and comprising a floor treatment device, which ensures that a floor surface can be treated in a treatment area comprising a predetermined location relative to the wheels, as well as comprising a treatment width perpendicular to the driving direction, wherein the controller is configured to perform a treatment mode,
    the treatment mode ensures that on the floor surface to be treated, groups of driving lines which run next to one another can be swept over by the treatment area of the floor treatment machine, wherein a treatment direction with a forwards and backwards orientation is aligned perpendicularly to route sections, and a position and alignment of the floor treatment machine in the floor coordinate system is provided by a position detection device, wherein route segments on the driving lines can be driven from starting points to end points, each of the driving lines being in one driving direction, the driving directions on adjacent driving lines are each oriented in opposite directions, the end points are established in that driving cannot be continued on the respective driving line due to a real or virtual obstacle, which is detected by the obstacle recognition device,
    for the end points in each case a starting point as well as the end point of the route segment, which was followed, at least one of the states "completely treated" or "incompletely treated" and also a direction information, at least in the case of "incompletely treated" are stored in a route segment storage, wherein an orientation of the treatment direction for incompletely treated areas is based on the direction information for the corresponding end point, and
    a contour-following movement, in response to which the floor treatment machine follows the obstacle until it encounters a driving line, can be triggered at the end points for finding new starting points in each case, wherein the contour-following movement starts in the direction of the respective current orientation of the treatment direction,
        when encountering the driving line, which was followed prior to the contour-following movement, on a route segment, which, according to the route segment storage, has not yet been followed, a new starting point is established at that location and the driving direction of this driving line is chosen,
        when encountering an adjacent driving line on a route segment, which, according to the route segment storage, has not yet been followed, a new starting point is established at that location and the driving direction of this adjacent driving line is chosen,
        when encountering a driving line on a route segment, which, according to the route segment storage, has already been followed, the end of a group of route segments, which run next to one another, is established, wherein the controller then looks for an end point comprising the state "incompletely treated" in the route segment storage and approaches it with a position search movement, so as to tackle a new group of route sections, which run next to one another, starting at this end point in the orientation of the treatment direction stored for this end point, until no end point comprising the state "incompletely treated" is current any longer,
    wherein the controller comprises a planning mode which enables, on the floor surface to be treated, determination of at least two zones, in each zone a first node, and a connection route from at least one zone to a first node of another zone, wherein to determine a zone, at least one section of its zone boundary can be entered as a virtual obstacle, so that a direct connection between the first node of the established zone and the first node of another zone is interrupted by the entered section of the zone boundary because of the real or virtual obstacle, and the treatment mode prevents a change of the floor treatment machine from a current zone under treatment to another zone to be treated because of the real or virtual obstacle and only permits a drive from the current zone to the first node of the other zone to be treated by canceling the effect of a region of the zone boundary of the current zone arranged as the virtual obstacle between the first nodes of the two zones when an end point having the state "incompletely treated" is no longer present in the current zone after passing over this zone, wherein after reaching the first node of the other zone to be treated, at least one region of the zone boundary of the other zone to be treated is entered as the virtual obstacle, so that an exit from the zone to be treated is prevented until it is completely treated.

2. The floor treatment machine according to claim 1, wherein the planning mode enables determination of zones spaced apart from one another, adjoining one another, and also overlapping, wherein at least one region of its zone boundary, or the entire zone boundary, can be entered as the virtual obstacle for each zone and in each case only the virtual obstacles of the presently processed zone are active and zone boundaries of other zones can be passed over.

3. The floor treatment machine according to claim 1, wherein the planning mode allows a treatment direction, which is specified for the treatment mode in the corresponding zone, to be assigned to each first node and to the zone which is associated with the first node.

4. The floor treatment machine according to claim 1, wherein in the treatment mode, the floor treatment machine is moved to the first node of the current zone if an end point having the state "incompletely treated" is no longer present in the current zone after passing over this zone and accordingly the change from the current zone to another zone is carried out by driving the floor treatment machine to the first node of another zone, wherein the floor treatment device is to be moved into a raised state during the drive to the another zone.

5. The floor treatment machine according to claim 4, wherein the planning mode enables at least one further node and a sequence of the at least one further node on the route between two first nodes to be determined and the treatment mode enables the change from the current zone to another zone to be carried out by a drive of the floor treatment machine via the at least one further node according to this sequence.

6. The floor treatment machine according to claim 5, wherein the at least one further node is located on a passage route outside all zones to be treated and the treatment mode enables the opening of a door or the triggering of travel using an elevator at this further node.

7. The floor treatment machine according to claims 4, wherein the planning mode permits a change route between two first nodes to be associated with one or both connection directions and the treatment mode enables the change route to be carried out accordingly in one or both connection directions.

8. The floor treatment machine according to claim 1, wherein the treatment mode ensures that the state "completely treated" or "incompletely treated", which is assigned to a current end point, can be determined by a distance from the current end point to a closest starting point on a driving line, which is located in the orientation, which is opposite to the current orientation of the treatment direction, directly next to the driving line comprising the current end point, wherein the state "incompletely treated" is chosen in a case of the distance being above a predetermined value.

9. The floor treatment machine according to claim 1, wherein the floor treatment device is a cleaning device, comprising at least one brush, a cleaning liquid supply, a suction arrangement, a dry vacuum, a spray suction device, or a sweeper.

10. A method for treating a floor surface by a floor treatment machine, comprising a housing, two drive wheels, at least one support wheel, a drive device, a controller, at least one obstacle-recognizing device and comprising a floor treatment device, the method comprising:

treating the floor surface in a treatment area comprising a predetermined location relative to the wheels, as well as comprising a treatment width perpendicular to the driving direction, wherein, in a treatment mode on the floor surface, to be treated, groups of driving lines, which run next to one another, are swept over by the treatment area of the treatment machine aligning a treatment direction perpendicularly with a forwards and backwards orientation to route sections, wherein a position and alignment of the floor treatment machine in a floor coordinate system are provided by a position detection device, driving the floor treatment device along route segments on the driving lines from starting points to end points, wherein each of the route segments are in one driving direction, and the driving directions on adjacent driving lines are oriented in opposite directions, wherein the end points are established in that driving cannot be continued on a respective driving line due to a real or virtual obstacle, which is detected by an obstacle recognition device, storing, for an end point of the end points, a starting point of the starting points as well as the end point of a respective route segment which was followed, at least one of the states "completely treated" or "incompletely treated", storing, at least in a case of "incompletely treated", a direction information in a route segment storage, wherein an orientation of the treatment direction for incompletely treated areas is based on the direction information for a corresponding end point, following, via a contour-following movement, the real or virtual obstacle until the floor treatment machine encounters a driving line of the groups of driving lines, the contour-following movement being triggered at the end points for finding new starting points in each case, wherein the contour-following movement starts in a direction of the respective current orientation of the treatment direction, and establishing a new starting point and a driving direction of the driving line, when encountering the driving line, which was followed prior to the contour-following movement, on the route segment, and which, according to the route segment storage, has not yet been followed, establishing the new starting point and the driving direction of an adjacent driving line, when encountering the adjacent driving line on the route segment, which, according to the route segment storage, has not yet been followed, or establishing an end of a group of route segments that run next to one another, when encountering a driving line on a route segment, which, according to the route segment storage, has already been followed, wherein the controller then looks for an end point comprising the state "incompletely treated" in the route segment storage and approaches the end point with a position search movement, so as to tackle a new group of route sections, which run next to one another, starting at this end point in the orientation of the treatment direction stored for this end point, until no end point comprising the state "incompletely treated" is current any longer, wherein in a planning mode, on the floor surface to be treated, at least two zones, in each zone a first node and from at least one zone a connection route to a first node of another zone are determined, wherein to determine a zone, at least one section of its zone boundary is entered as a virtual obstacle, so that a direct connection between the first node of the established zone and the first node of another zone is interrupted by the entered section of the zone boundary during the treatment of the determined zone because of the real and virtual obstacles, and in the treatment mode, a change of the floor treatment machine from the current zone under treatment to another zone to be treated is prevented because of the real and virtual obstacles and a drive from this current zone to the first node of the other zone to be treated is only permitted by canceling the effect of a section of the zone boundary of the current zone entered as a virtual obstacle between the first node of the two zones when an end point having the state "incompletely treated" is no longer present in the current zone after passing over this zone, wherein after reaching the first node of the other zone to be treated, at least one section of the zone boundary of the other zone to be treated is used as a virtual obstacle, so that an exit from the zone to be treated is prevented until the zone is completely treated.

11. The method according to claim 10, wherein in the planning mode, zones spaced apart from one another and/or adjoining one another and/or overlapping are determined, wherein at least a section of its zone boundary, or the entire zone boundary, can be entered as a virtual obstacle for each zone and in each case only the virtual obstacles of the presently processed zone are active and therefore zone boundaries of other zones can be passed over.

12. The method according to claim 10, wherein in the planning mode, a treatment direction, which is specified for the treatment mode in the corresponding zone, is assigned to each first node and thus to the zone which is associated with the first node.

13. The method according to claim 10, wherein, in the treatment mode, the state "completely treated" or "incompletely treated", which is to be assigned to a current end point, is determined by a distance from the current end point to the closest starting point on a driving line, which is located in the orientation, which is opposite to the current orientation of the treatment direction, directly next to the driving line comprising the current end point, wherein the state "incompletely treated" is chosen in a case of the distance being above a predetermined value.

14. A non-transitory computer readable storage medium comprising computer program code, which triggers the execution of the method according to claim 10 on a program-controlled floor treatment machine.

\* \* \* \* \*